United States Patent
Nair

(10) Patent No.: US 8,315,436 B2
(45) Date of Patent: *Nov. 20, 2012

(54) ROBUST CAMERA PAN VECTOR ESTIMATION USING ITERATIVE CENTER OF MASS

(75) Inventor: Hari N. Nair, Bangalore (IN)

(73) Assignee: Tamiras Per Pte. Ltd., LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/177,963

(22) Filed: Jul. 7, 2011

(65) Prior Publication Data

US 2011/0262011 A1    Oct. 27, 2011

Related U.S. Application Data

(63) Continuation of application No. 12/257,204, filed on Oct. 23, 2008, now Pat. No. 8,019,124, which is a continuation of application No. 10/868,169, filed on Oct. 7, 2004, now Pat. No. 7,457,438.

(60) Provisional application No. 60/532,838, filed on Dec. 23, 2003.

(51) Int. Cl.
  *G06K 9/00*    (2006.01)
  *H04N 5/14*    (2006.01)

(52) U.S. Cl. .................. 382/107; 348/699

(58) Field of Classification Search .......... 382/107; 348/416, 699
  See application file for complete search history.

(56) References Cited

U.S. PATENT DOCUMENTS

| | | | |
|---|---|---|---|
| 4,125,856 A | 11/1978 | Netravali |
| 4,651,211 A | 3/1987 | Weckenbrock |
| 4,652,907 A | 3/1987 | Fling |
| 4,980,764 A | 12/1990 | Henot |
| 5,259,040 A | 11/1993 | Hanna |
| 5,311,306 A | 5/1994 | Tanaka |
| 5,317,397 A | 5/1994 | Odaka |
| 5,400,083 A | 3/1995 | Mizusawa |
| 5,500,686 A | 3/1996 | Yamaguchi |
| 5,519,438 A | 5/1996 | Elliott |
| 5,539,663 A | 7/1996 | Agarwal |

(Continued)

FOREIGN PATENT DOCUMENTS

CN    1127906    7/1996

(Continued)

OTHER PUBLICATIONS

Bellers, E. B., and G. De Haan, "Advanced De-Interlacing Techniques," Proceedings of the ProRISC/IEEE Workshop on Circuits, Systems and Signal Processing, Mierlo, Netherlands, Nov. 1996, pp. 1-13.

(Continued)

*Primary Examiner* — Vu Le
*Assistant Examiner* — Amara Abdi
(74) *Attorney, Agent, or Firm* — Christensen O'Connor Johnson Kindness PLLC

(57) ABSTRACT

Methods and apparatus, including computer program products, implementing and using techniques for camera pan vector estimation, are disclosed. A camera model is provided for representing motion vectors based on a plurality of parameters. A distribution of the motion vectors is generated. A cluster in the distribution of motion vectors is identified. A center of mass of the identified cluster is determined. The camera pan vector is provided based upon the determined center of mass.

23 Claims, 10 Drawing Sheets

U.S. PATENT DOCUMENTS

| | | | |
|---|---|---|---|
| 5,583,580 | A | 12/1996 | Jung |
| 5,764,803 | A | 6/1998 | Jacquin |
| 5,777,682 | A | 7/1998 | De Haan |
| 5,786,872 | A | 7/1998 | Miyazaki |
| 5,799,111 | A | 8/1998 | Guissin |
| 5,819,035 | A | 10/1998 | Devaney |
| 5,838,383 | A | 11/1998 | Chimoto |
| 5,844,623 | A | 12/1998 | Iwamura |
| 5,987,164 | A | 11/1999 | Szeliski |
| 5,990,978 | A | 11/1999 | Kim |
| 6,041,145 | A | 3/2000 | Hayashi |
| 6,178,205 | B1 | 1/2001 | Cheung |
| 6,178,265 | B1 | 1/2001 | Haghighi |
| 6,236,763 | B1 | 5/2001 | Wong |
| 6,246,827 | B1 | 6/2001 | Strolle |
| 6,278,736 | B1 | 8/2001 | De Haan |
| 6,300,985 | B1 | 10/2001 | Lowe |
| 6,317,165 | B1 | 11/2001 | Balram |
| 6,349,114 | B1 | 2/2002 | Mory |
| 6,359,658 | B1 | 3/2002 | He |
| 6,462,790 | B1 | 10/2002 | Lowe |
| 6,658,059 | B1 | 12/2003 | Iu |
| 6,674,488 | B1 | 1/2004 | Satoh |
| 6,774,954 | B1 | 8/2004 | Lee |
| 7,003,173 | B2 | 2/2006 | Deshpande |
| 7,027,102 | B2 | 4/2006 | Sacca |
| 7,046,306 | B2 | 5/2006 | Zhai |
| 7,076,113 | B2 | 7/2006 | Le Dinh |
| 7,203,237 | B2 | 4/2007 | Fernandes |
| 7,274,408 | B2 | 9/2007 | Shan |
| 7,324,163 | B2 | 1/2008 | Bacche |
| 7,346,109 | B2 | 3/2008 | Nair |
| 7,346,226 | B2 | 3/2008 | Shyshkin |
| 7,349,033 | B2 | 3/2008 | Chang |
| 7,457,438 | B2 | 11/2008 | Nair |
| 7,480,334 | B2 | 1/2009 | Nair |
| 7,499,494 | B2 | 3/2009 | Nair |
| 7,535,515 | B2 | 5/2009 | Bacche |
| 2002/0113901 | A1 | 8/2002 | Osberger |
| 2002/0163595 | A1 | 11/2002 | Adams |
| 2002/0163969 | A1 | 11/2002 | Zhong |
| 2002/0191841 | A1 | 12/2002 | Harman |
| 2002/0196362 | A1 | 12/2002 | Yang |
| 2003/0072373 | A1 | 4/2003 | Sun |
| 2003/0086498 | A1 | 5/2003 | Lee |
| 2003/0152149 | A1 | 8/2003 | Denolf |
| 2003/0156646 | A1 | 8/2003 | Hsu |
| 2003/0194151 | A1 | 10/2003 | Wang |
| 2004/0008777 | A1 | 1/2004 | Swartz |
| 2004/0120401 | A1 | 6/2004 | Linzer |
| 2004/0189875 | A1 | 9/2004 | Zhai |
| 2004/0202250 | A1 | 10/2004 | Kong |
| 2005/0013365 | A1 | 1/2005 | Mukerjee |
| 2005/0013378 | A1* | 1/2005 | Song ........................ 375/240.28 |
| 2005/0128355 | A1 | 6/2005 | Kang |
| 2005/0129330 | A1 | 6/2005 | Shyshkin |
| 2005/0134740 | A1 | 6/2005 | Bacche |
| 2005/0134745 | A1 | 6/2005 | Bacche |
| 2005/0168650 | A1 | 8/2005 | Walls |
| 2005/0276329 | A1 | 12/2005 | Adiletta |
| 2006/0072790 | A1* | 4/2006 | Wittebrood et al. .......... 382/107 |
| 2006/0077306 | A1 | 4/2006 | Suyambukesan |
| 2006/0232666 | A1 | 10/2006 | Op De Beeck |
| 2007/0092111 | A1 | 4/2007 | Wittebrood |
| 2009/0116557 | A1 | 5/2009 | Nair |

FOREIGN PATENT DOCUMENTS

| | | |
|---|---|---|
| EP | 0 242 935 A1 | 10/1987 |
| EP | 0 294 956 A2 | 12/1988 |
| EP | 0 376 330 A2 | 7/1990 |
| EP | 0 466 981 A1 | 1/1992 |
| EP | 0 772 365 A2 | 5/1997 |
| EP | 0 849 950 A2 | 6/1998 |
| EP | 1 117 251 A1 | 7/2001 |
| EP | 1 549 048 A2 | 6/2005 |
| EP | 1 587 328 A2 | 10/2005 |
| GB | 2 286 740 A | 8/1995 |
| GB | 2 311 183 A | 9/1997 |
| JP | 1-318491 A | 12/1989 |
| JP | 8-79760 A | 3/1996 |
| JP | 8-163583 A | 6/1996 |
| JP | 9-46726 A | 2/1997 |
| JP | 2737146 B2 | 1/1998 |
| JP | 10-233958 A | 9/1998 |
| JP | 2942261 B2 | 6/1999 |
| JP | 11-317943 A | 11/1999 |
| JP | 2000-188680 A | 7/2000 |
| JP | 3231309 B2 | 9/2001 |
| WO | 87/05770 A1 | 9/1987 |
| WO | 94/06098 A1 | 3/1994 |
| WO | 99/60779 A1 | 11/1999 |
| WO | 00/30359 A1 | 5/2000 |
| WO | 00/54516 A1 | 9/2000 |
| WO | 02/09611 A2 | 2/2002 |
| WO | 02/19721 A2 | 3/2002 |
| WO | 02/087210 A2 | 10/2002 |
| WO | 03/007618 A2 | 1/2003 |

OTHER PUBLICATIONS

Braun, M., et al., "Motion-Compensating Real-Time Format Converter for Video on Multimedia Displays," Proceedings of the IEEE 4th International Conference on Image Processing (ICIP '97), Washington, D.C., Oct. 26-29, 1997, vol. 1, pp. 125-128.

Choi, S.-U., et al., "Motion Adaptive 3D Y/C Separation Algorithm Using Motion Estimation and Motion Compensation," IEEE Transactions on Consumer Electronics 47(4):770-778, Nov. 2001.

De Haan, G., and E. B. Bellers, "De-Interlacing of Video Data," IEEE Transactions on Consumer Electronics 43(3):819-825, Aug. 1997.

De Haan, G., "IC for Motion Compensated De-Interlacing, Noise Reduction, and Picture Rate Conversion," Digest of Technical Papers: IEEE International Conference on Consumer Electronics (ICCE), Los Angeles, Jun. 22-24, 1999, pp. 212-213.

De Haan, G., and R. J. Schutten, "Real-Time 2 3 Pull-Down Elimination Applying Motion Estimation/Compensation in a Programmable Device," Digest of Technical Papers: IEEE International Conference on Consumer Electronics (ICCE), Jun. 2-4, 1998, pp. 356-357.

De Haan, G., et al., "Television Noise Reduction IC," IEEE Transactions on Consumer Electronics 44(1):143-154, Feb. 1998.

Delogne, P., et al., "Improved Interpolation, Motion Estimation, and Compensation for Interlaced Pictures," IEEE Transactions on Image Processing 3(5):482-491, Sep. 1994.

Gu, Q. S., et al., "IIR Digital Filters for Sampling Structure Conversion and Deinterlacing of Video Signals," Proceedings of the IEEE International Symposium on Circuits and Systems (ISCAS '95), Seattle, Apr. 28-May 3, 1995, vol. 2, pp. 973-976.

Jostschulte, K., et al., "A Subband Based Spatio-Temporal Noise Reduction Technique for Interlaced Video Signals," Digest of Technical Papers: IEEE International Conference on Consumer Electronics (ICCE), Los Angeles, Jun. 2-4, 1998, pp. 438-439.

Jostschulte, K., et al., "Perception Adaptive Temporal TV-Noise Reduction Using Contour Preserving Prefilter Techniques," IEEE Transactions on Consumer Electronics 44(3):1091-1096, Aug. 1998.

Kalevo, O., and P. Haavisto, "Deinterlacing of Video Signals Using Nonlinear Interpolation With Simple Motion Compensation," Proceedings of the IEEE Winter Workshop on Nonlinear Digital Signal Processing, Jan. 17-20, 1993, pp. 4.1-4.6.

Kalevo, O., and P. Haavisto, "Motion Compensated Deinterlacing," Digest of Technical Papers: IEEE International Conference on Consumer Electronics (ICCE), Rosemont, Ill., Jun. 8-10, 1993, pp. 40-41.

Kovačević, J., et al., "Deinterlacing by Successive Approximation," IEEE Transactions on Image Processing 6(2):339-344, Feb. 1997.

Kwon, O., et al., "Deinterlacing Using Directional Interpolation and Motion Compensation," IEEE Transactions on Consumer Electronics 49(1):198-203, Feb. 2003.

Liang, Y., "Phase-Correlation Motion Estimation," Digital Video Processing (EE 392J): Student Final Project, Stanford University, Palo Alto, Calif., Winter 2000, pp. 1-9.

Migliorati, P., and S. Tubaro, "Multistage Motion Estimation for Image Interpolation," Signal Processing: Image Communication 7(3):187-199, Sep. 1995.

Oh, H.-S., et al., "Spatio-Temporal Edge-Based Median Filtering for Deinterlacing," Digest of Technical Papers: IEEE International Conference on Consumer Electronics (ICCE), Los Angeles, Jun. 13-15, 2000, pp. 52-53.

Ohm, J.-R., and K. Rümmler, "Variable-Raster Multiresolution Video Processing With Motion Compensation Techniques," Proceedings of the IEEE 4th International Conference on Image Processing (ICIP '97), Washington, D.C., Oct. 26-29, 1997, vol. 1, pp. 759-762.

Park, J.-I., and C. W. Lee, "Robust Estimation of Camera Parameters From Image Sequence for Video Composition," Signal Processing: Image Communication 9(1):43-53, Nov. 1996.

Patti, A. J., et al., "A New Motion-Compensated Reduced-Order Model Kalman Filter for Space-Varying Restoration of Progressive and Interlaced Video," IEEE Transactions on Image Processing 7(4):543-554, Apr. 1998.

Ryu, C., and S. P. Kim, "Deinterlacing Using Motion Compensated Local Spectra," Proceedings of the 29th Asilomar Conference on Signals, Systems and Computers, Pacific Grove, Calif., Oct. 30-Nov. 2, 1995, vol. 2, pp. 1394-1397.

Schu, M., et al., "System on Silicon—IC for Motion Compensated Scan Rate Conversion, Picture-in-Picture Processing, Split Screen Applications and Display Processing," IEEE Transactions on Consumer Electronics 45(3):842-850, 1999.

Sun, C., "De-Interlacing of Video Images Using a Shortest Path Technique," IEEE Transactions on Consumer Electronics 47(2):225-230, May 2001.

Thomas, G. A., "A Comparison of Motion-Compensated Interlace-to-Progressive Conversion Methods," BBC Research and Development Report (BBC RD 1996/9), 1996, 18 pages.

Vandendorpe, L., et al., "Generalized Interpolators for Advanced Movement-Compensated 50HZ-60HZ Conversion of Interlaced Sequences," Proceedings of the IEEE 4th International Conference on Image Processing (ICIP'95), Washington, D.C., Oct. 22-26, 1997, vol. 2, pp. 237-240.

Vella, F., et al., "Digital Image Stabilization by Adaptive Block Motion Vectors Filtering," IEEE Transactions on Consumer Electronics 48(3):796-801, Aug. 2002.

Yang, S., et al., "Low Bit Rate Video Sequence Coding Artifact Removal," Proceedings of the IEEE 4th Workshop on Multimedia Signal Processing, Cannes, France, Oct. 3-5, 2001, pp. 53-58.

Yuen, M., and H. R. Wu, "A Survey of Hybrid MC/DPCM/DCT Video Coding Distortions," Signal Processing 70(3):247-278, Nov. 1998.

European Patent Office Search Report mailed Jun. 1, 2005, issued in European Patent Application No. EP 04 25 8048.0, filed Dec. 22, 2004, 3 pages. [IVEN-1-32608].

European Patent Office Search Report mailed Apr. 13, 2006, issued in European Patent Application No. EP 04 25 7854.2, filed Dec. 16, 2004, 3 pages.

Danish Patent & Trademark Office Examination Report mailed Mar. 23, 2007, issued in Singapore Application No. SG 200407680-8, filed Dec. 28, 2004, 9 pages.

Australian Patent Office Examination Report mailed May 18, 2007, issued in Singapore Application No. SG 200406810-2, filed Nov. 22, 2004, 4 pages.

European Examination Report mailed Sep. 11, 2006, issued in European Patent Application No. EP 04 25 7653.8, filed Dec. 14, 2004, 8 pages.

Australian Patent Office Search Report and Written Opinion mailed May 31, 2006, issued in Singapore Application No. SG 200406810-2, filed Nov. 22, 2004, 6 pages.

European Patent Office Search Report mailed Apr. 11, 2006, issued in European Application No. EP 04 257 653.8, 4, filed Dec. 14, 2004, 4 pages.

Australian Patent Office Search Report mailed Feb. 2, 2006, issued in Singapore Patent Application No. SG 200406853-2, filed Nov. 24, 2004, 6 pages.

First Office Action mailed Aug. 24, 2007, issued in Chinese Application No. CN 200410102094.X, filed Dec. 22, 2004, 7 pages.

First Office Action mailed Aug. 17, 2007, issued in Chinese Application No. CN 200410102089.9, filed Dec. 22, 2004, 13 pages.

European Examination Report mailed Nov. 12, 2007, issued in European Application No. EP 04 257 854.2, filed Dec. 16, 2004, 5 pages.

European Examination Report mailed Nov. 13, 2007, issued in European Application No. EP 04 257 855.9, filed Dec. 16, 2004, 2 pages.

Office Action mailed Nov. 6, 2007, issued in U.S. Appl. No. 10/868,169, filed Oct. 7, 2004, 13 pages.

Office Action mailed Apr. 22, 2008, issued in U.S. Appl. No. 10/868,169, filed Oct. 7, 2004, 15 pages.

Office Action mailed Dec. 13, 2007, issued in U.S. Appl. No. 10/866,460, filed Jun. 10, 2004, 5 pages.

Office Action mailed May 6, 2008, issued in U.S. Appl. No. 10/866,460, filed Jun. 10, 2004, 6 pages.

Examination Report mailed Sep. 28, 2006, issued in Singapore Application No. SG 200506302-9, filed Sep. 29, 2005, 4 pages.

Search Report mailed Sep. 28, 2006, issued in Singapore Application No. SG 200506302-9, filed Sep. 29, 2005, 4 pages.

Australian Patent Office Written Opinion mailed Feb. 14, 2006, issued in Singapore Application No. SG 200407681-6, filed Dec. 23, 2004, 5 pages.

Australian Patent Office Search Report mailed Feb. 14, 2006, issued in Singapore Application No. SG 200407681-6, filed Dec. 23, 2004, 4 pages.

Office Action mailed Jan. 15, 2008, issued in U.S. Appl. No. 10/833,198, filed Apr. 26, 2004, 7 pages.

Patent Office Search Report mailed Feb. 8, 2006, issued in Singapore Application No. SG 200406862-3, filed Nov. 24, 2004, 4 pages.

European Patent Office Search Report mailed Jan. 12, 2006, issued in EP Application No. EP 04 25 7855.9, Dec. 16, 2004, 3 pages.

Office Action mailed Jun. 26, 2008, issued in U.S. Appl. No. 10/833,198, filed Apr. 26, 2004, 7 pages.

European Patent Office Search Report mailed Jan. 17, 2006, issued in EP Application No. EP 04 258 046, filed Dec. 22, 2004, 4 pages.

European Patent Office Search Report mailed Sep. 17, 2008, issued in EP Application No. EP 05 25 6353, filed Oct. 13, 2005, 6 pages.

Office Action mailed Jan. 6, 2010, issued in U.S. Appl. No. 12/257,204, filed Oct. 23, 2008, 9 pages.

Final Office Action mailed May 26, 2010, issued in U.S. Appl. No. 12/257,204, filed Oct. 23, 2008, 15 pages.

Office Action mailed Apr. 24, 2008, issued in U.S. Appl. No. 10/986,518, filed Nov. 10, 2004, 12 pages.

Final Office Action mailed Oct. 8, 2008, issued in U.S. Appl. No. 10/986,518, filed Nov. 10, 2004, 7 pages.

Japanese Office Action mailed Jun. 28, 2010, issued in Japanese Application No. JP 2004-370666, filed Dec. 22, 2004, 4 pages.

Japanese Office Action mailed Jun. 17, 2010, issued in Japanese Application No. JP 2004-369568, filed Dec. 21, 2004, 3 pages.

Japanese Office Action mailed Oct. 4, 2010, issued in Japanese Application No. JP 2004-370682, filed Dec. 22, 2004, 3 pages.

Chinese Office Action mailed Apr. 6, 2010, issued in Chinese Application No. CN 200810088727.4, filed Dec. 22, 2004, 4 pages.

European Office Action mailed Apr. 29, 2010, issued in European Application No. EP 04 258 046, filed Dec. 22, 2004, 5 pages.

European Office Action mailed May 18, 2010, issued in European Application No. EP 04 257 653.8, filed Dec. 14, 2004, 6 pages.

Japanese Office Action mailed Feb. 22, 2011, issued in Japanese Application No. JP 2004-361159, filed Dec. 14, 2004, 11 pages.

Hiromatsu, T., et al., "Introduction to Statistics," 1st ed., Asakura Shoten, Ltd., Oct. 15, 1998, 9 pages.

Korean Office Action mailed Mar. 21, 2011, issued in Korean Application No. 10-2004-0100131, filed Dec. 2, 2004, 6 pages.

Korean Office Action mailed Mar. 30, 2011, issued in Korean Application No. 10-2004-0109975, filed Dec. 22, 2004, 6 pages.

Japanese Office Action mailed Mar. 29, 2011, issued in Japanese Application No. JP 2004-370682, filed Dec. 22, 2004, 4 pages.

Korean Office Action mailed Apr. 11, 2011, issued in Korean Application No. 110-2004-0100127, filed Dec. 2, 2004, 6 pages.

Chinese Office Action mailed Apr. 6, 2011, issued in Chinese Application No. CN 200810088727.4, filed Dec. 22, 2004, 7 pages.

Japanese Office Action mailed Apr. 8, 2011, issued in Japanese Application No. JP 2004-369568, filed Dec. 21, 2004, 7 pages.

Taiwanese Office Action mailed May 20, 2011, issued in Taiwanese Application No. TW 093140046, filed Dec. 22, 2004, 9 pages.
Notice of Allowance mailed Nov. 10, 2010, issued in U.S. Appl. No. 12/257,204, filed Oct. 23, 2008, 28 pages.
Notice of Allowance mailed Mar. 29, 2011, issued in U.S. Appl. No. 12/257,204, filed Oct. 23, 2008, 11 pages.
"Basic Statistics," in Chikio Hayashi (ed.), Apr. 25, 1991, Asakura Book Co., pp. 76-77.

Japanese Office Action mailed Jul. 19, 2011, issued in Japanese Application No. JP 2004-361159, filed Dec. 14, 2004, 6 pages.
European Office Action mailed Mar. 16, 2012, issued in EP 04 258 046.4, filed Dec. 22, 2004, 3 pages.

* cited by examiner

ROBUST CAMERA PAN VECTOR ESTIMATION USING ITERATIVE CENTER OF MASS

CROSS-REFERENCE TO RELATED APPLICATION

This application is a continuation of and claims the benefit of priority from U.S. application No. 12/257,204, filed Oct. 23, 2008. which, in turn. is a continuation of U.S. patent application. No. 10/868,169 filed Oct. 7, 2004, now U.S. Pat. No. 7,457,438, issued Nov. 25, 2008, which, in turn, claims the benefit of priority from U.S. Provisional Patent Application No. 60/532,838, filed Dec. 23, 2003, all of which are hereby incorporated by reference herein in their entirety.

BACKGROUND

This invention relates to improving video and graphics processing.

Standard video and film content for display devices is recorded and displayed at low refresh rates (for example, 50 fields/sec for interlaced video material, and 24 frames/sec for film-originated material). One associated problem with such devices, including progressive digital display devices, is the presence of display artifacts. For example, one display artifact referred to as "area flicker" can occur due to the low display refresh rate. The area flicker becomes more visible as the size of the display increases, due to the high sensitivity to flicker in the human visual peripheral region. A simple solution for reducing the area flicker is to increase the display refresh rate by repeating the input fields or frames at a higher rate (for example, 100 fields/sec for interlaced video). This solves the area flicker problem for static scenes. However, the repetition introduces a new artifact in scenes with motion, known as "motion judder" or "motion smear," particularly in areas with high contrast, due to the human eye's tendency to track the trajectory of moving objects. For this reason, motion compensated frame interpolation is preferred, in which the pixels are computed in an interpolated frame or field at an intermediate point on a local motion trajectory, so that there is no discrepancy between an expected image motion due to eye tracking and a displayed image motion. The local image motion trajectory from one field or frame to the next is described by a motion vector.

Motion vectors can be computed at different levels of spatial resolution, such as at a pixel level, at an image patch level, or at an object level. "Image patch" refers to any portion of an image displayed in a frame. The image patch can be a single pixel, a plurality of pixels, and can have various shapes and sizes. Computing a motion vector for every pixel independently would theoretically result in an ideal data set, but is unfeasible due to the large number of computations required. Computing a motion vector for each image patch reduces the number of computations, but can result in artifacts due to motion vector discontinuities within an image patch. Computing motion vectors on an object basis can theoretically result in high resolution and lower computational requirements, but object segmentation is a challenging problem.

Image noise and other problems can lead to errors in the computation and processing of motion vectors. Various techniques have been proposed in the search for accurate motion vector estimation. One of these techniques is the camera model, in which a mathematical model represents the movement of a camera which recorded the sequence of frames in a video signal. Camera models can provide mathematical representations of various camera movements including camera pans, zooms, and rotations. For instance, in a camera pan movement, the camera model provides a mathematical representation of the motion vectors associated with the camera moving in a horizontal and/or vertical direction at a constant velocity. The camera model is desirable because it can provide a global model of all of the motion vectors in an image patch or entire image frame. Thus, applying the camera model, every motion vector can be mathematically predicted at every location in the image frame.

One problem with conventional uses of camera models for motion vector estimation arises when there are two or more independently moving objects in a sequence of frames. In this situation, the independently moving objects introduce flaws into the camera model when attempting to fit the camera model to image data associated with the independently moving objects. For instance, in one sequence of frames, there are two moving objects: a car and a background image. The car, occupying 10% of the frame, moves westward in the horizontal direction. The background image, occupying 90% of the frame, moves eastward, opposite the car. The background image is the desired image for testing. Unless remedial measures are taken, the predicted camera model motion vectors associated with the background image will be erroneous due to the effect of the car movement. In particular, conventional techniques for computing the camera model would improperly fit a camera rotation to the background image rather than a proper camera pan. Resulting motion vectors predicted by this flawed camera model would also be erroneous at every point in the image.

Therefore, what is needed is a technique for fitting a camera model to a sequence of image frames wherein data associated with independently moving objects other than a particular moving object or background to be tested is excluded to achieve a more accurate camera model.

SUMMARY

Aspects of the present invention involve defining and applying a camera model which provides a robust fit for predicting motion vectors associated with an independently moving object or background in a sequence of frames in which there may be other independently moving objects.

In general, in one aspect, the invention provides methods and apparatus, including computer program products, implementing and using techniques for camera pan vector estimation. A camera model is provided for representing motion vectors based on a plurality of parameters. A distribution of the motion vectors is generated. A cluster in the distribution of motion vectors is identified. A center of mass of the identified cluster is determined. The camera pan vector is provided based upon the determined center of mass.

Implementations can include one or more of the following features. The motion vectors can include a two-dimensional set of values, and generating the distribution of the motion vectors can include generating a two-dimensional histogram having bins. The motion vector values are provided in appropriate bins of the two-dimensional histogram. Also, before generating the distribution of the motion vectors, the motion vectors can be projected in a lower resolution.

Identifying the cluster in the distribution of motion vectors can include accumulating bins within a first neighborhood in the two-dimensional histogram, accumulating bins within a second neighborhood in the two-dimensional histogram, selecting one of the neighborhoods as having a higher accumulation of bins, and providing the selected neighborhood as the identified cluster in the distribution of motion vectors.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
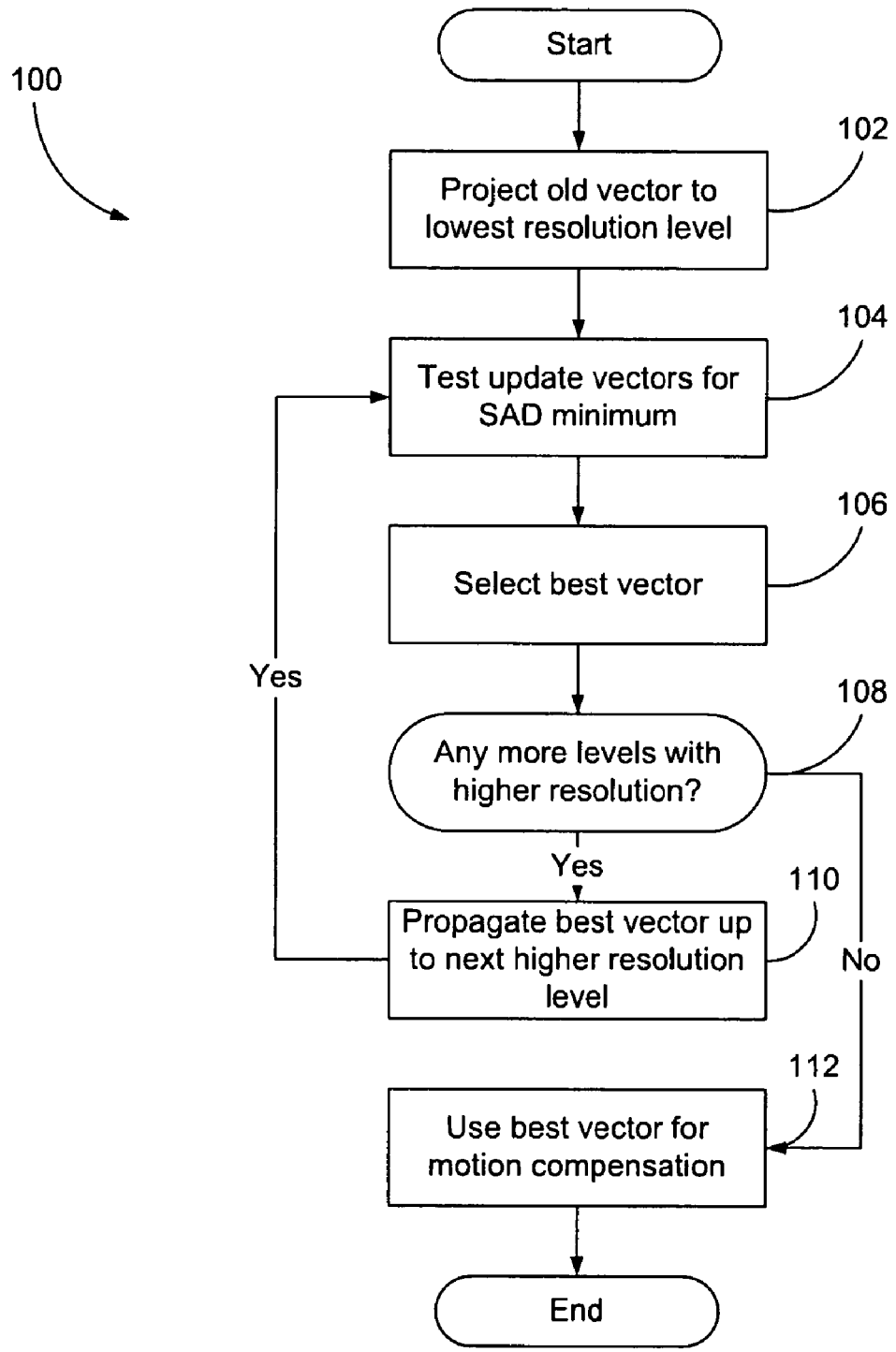
FIG. 1 shows a flowchart of a recursive hierarchical process for determining a motion vector.

Implementations of the present invention include a camera model used to provide a mathematical model of motion vectors for an image patch. The camera model represents a camera movement in a sequence of frames. For example, camera models can be used to provide for horizontal and/or vertical camera pans, zoom in or zoom out operations, and rotation operations. The camera model can also represent combinations of one or more of the above camera movements. The camera model provides a global description of motion vectors for a sequence of frames.

The camera model describes a global movement of the contents of the frame, as opposed to the local vectors at each image patch location that are computed independently and can therefore be used to aid in finding a more accurate, or true, motion vector. Typically, a motion vector resulting from camera movements at every location in a frame can be predicted quite easily with a simple model. For example, in the case of a camera lens panning across a distant landscape, all the motion vectors will be identical and equivalent to the velocity of the camera. Another scenario is when a camera lens zooms into an object on a flat surface, such as a picture on a wall. All the motion vectors then have a radial direction and increase from zero at the image center to a maximum value at the image periphery.

Embodiments of the present invention provide methods and apparatus for defining and applying a camera model which provides a robust fit for predicting motion vectors associated with an independently moving object in a sequence of frames in which there may be other independently moving objects. Disclosed herein are techniques for fitting a camera model to a sequence of image frames wherein data associated with independently moving objects other than a particular moving object or background to be tested is excluded to achieve a more accurate camera model. By excluding independently moving objects other than the particular moving object to be tested, a more accurate camera model is calculated, providing for more accurate motion vector prediction.

Embodiments of the present invention provide for the determination of parameters for a camera model, and the generating of motion vectors using the determined camera model parameters. A set of existing motion vectors stored in memory is provided, from which the camera model parameters are calculated. Applying a mathematical model, described below, a best fit method (such as linear least squares) is performed on the existing motion vectors to estimate the camera model parameters. The camera model parameters are then used to predict motion vectors for subsequent frames in a digital video sequence of frames. In a particular embodiment, this subsequent prediction of motion vectors using the camera model incorporates a recursive and hierarchical process such as that described in co-pending U.S. patent application entitled, "Temporal Motion Vector Filtering," having application Ser. No. 10/833,198 filed Apr. 26, 2004 which is incorporated by reference in its entirety for all purposes.

When calculating camera model parameters for a sequence of frames in which there are independently moving objects (some of which are moving in adverse directions to each other), embodiments of the present invention provide techniques for fitting the camera model to a dominant one of the independently moving objects and excluding the other independently moving objects. In most situations, the dominant object is the background. A set of input motion vectors having a first, or original resolution, are projected to a lower resolution to conserve memory resources. A histogram of all of the motion vector values is then generated to produce a distribution of the motion vectors. Motion vector values in bins of the histogram are accumulated to identify a dominant cluster of the motion vectors. Then a center of mass of this cluster is calculated while excluding other clusters of motion vectors in the two-dimensional distribution to achieve the desired robust fit. This center of mass provides one or more translation (or pan parameters) of the camera model. The camera model parameters are then used for later estimation of motion vectors using the camera model. In this way, motion vectors can be determined efficiently and accurately, such that little or no discrepancy exists between an expected image motion due to eye tracking and a displayed image motion in a digital video.

A mathematical representation of the camera model is as follows:

$$\begin{bmatrix} M_y \\ M_x \end{bmatrix} = \begin{bmatrix} S_y & r_1 \\ r_2 & S_x \end{bmatrix} \begin{bmatrix} y \\ x \end{bmatrix} + \begin{bmatrix} t_y \\ t_x \end{bmatrix} \quad (1)$$

Figure 2A:
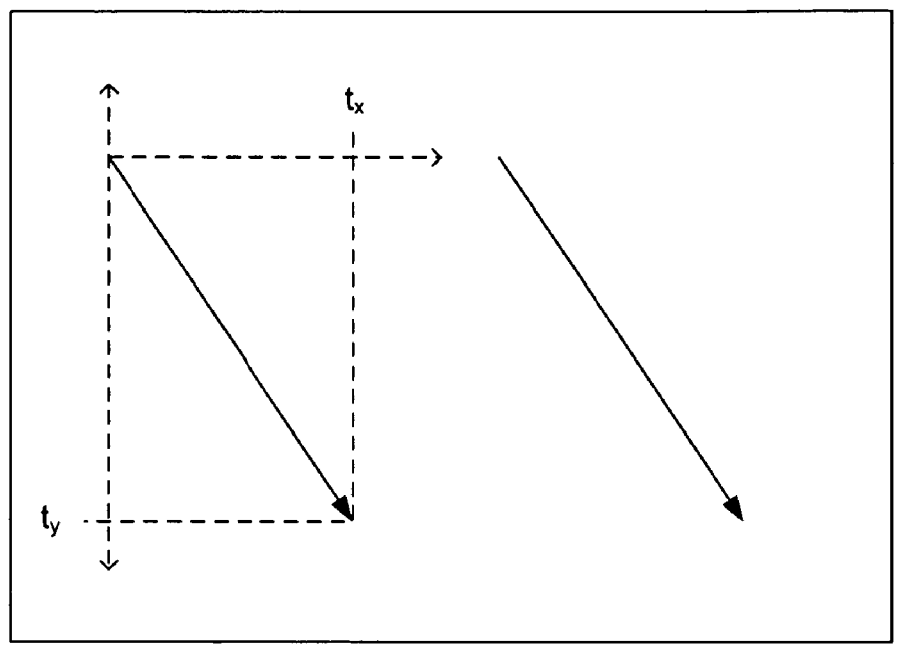
FIG. 2A shows an example of motion vectors associated with a camera pan.
Figure 2B:
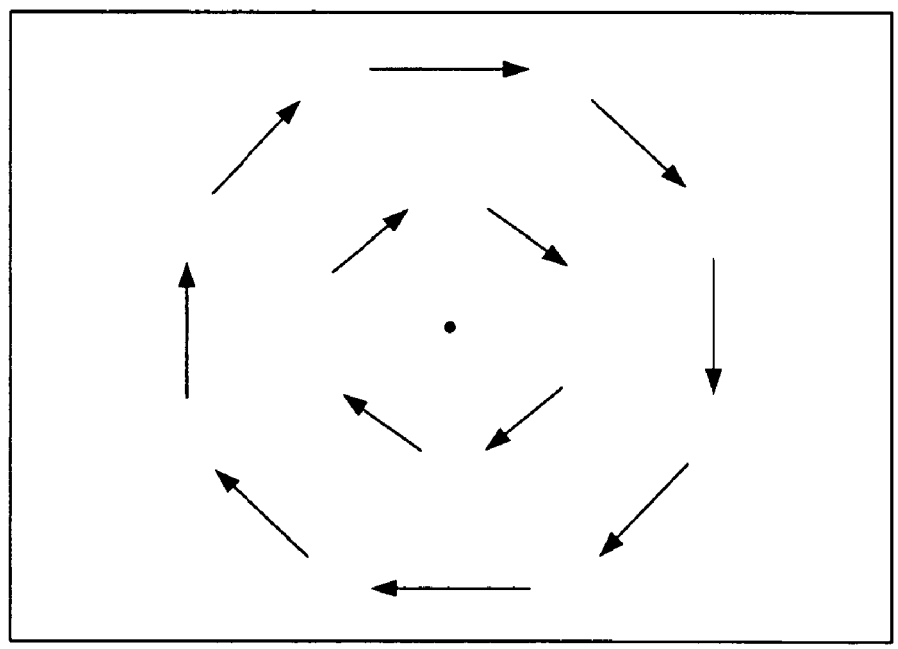
FIG. 2B shows an example of motion vectors associated with a camera rotation.
Figure 2C:
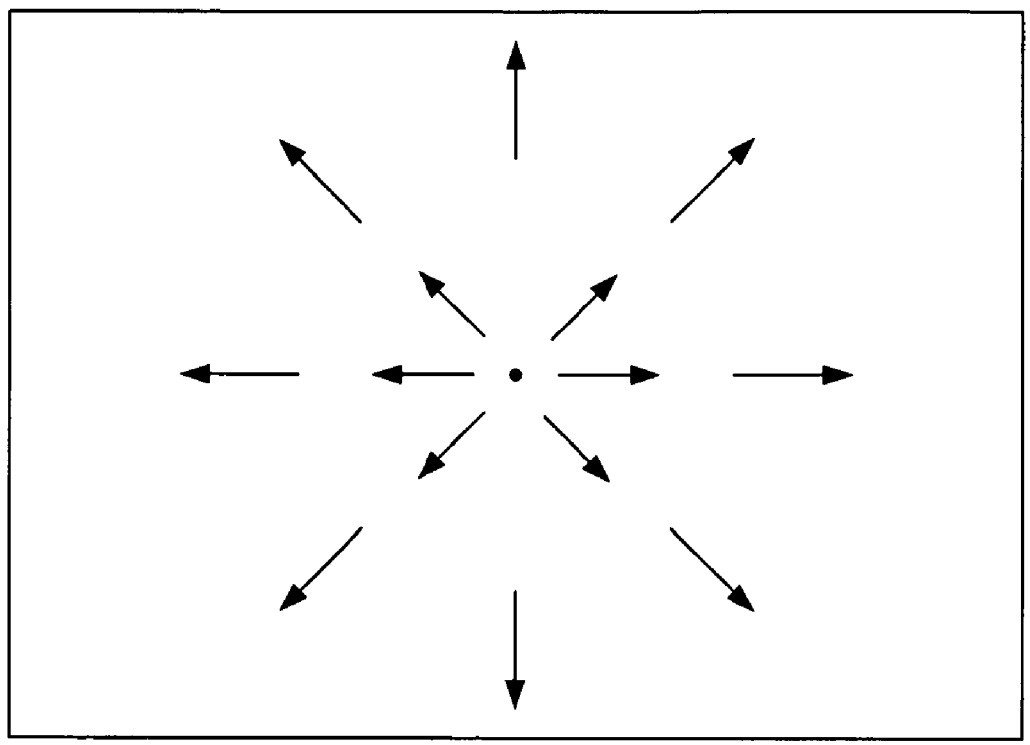
FIG. 2C shows an example of motion vectors associated with a camera zoom in operation.

In the equation above, the camera model provides an estimate of a plurality of motion vectors, $M_y$ and $M_x$, by applying camera model parameters $S_y$, $S_x$, $r_1$, $r_2$, $t_y$, and $t_x$ to a sequence of (x, y) locations in an image. $S_y$, $S_x$, $r_1$, $r_2$, $t_y$, and $t_x$ are parameters of the camera model representing camera movements. In the above model, $t_y$ and $t_x$ represent a horizontal and vertical translation, respectively, during a during a camera pan. An illustration of motion vectors associated with a camera pan is provided in FIG. 2A. In the equation above, $r_1$ and $r_2$, are parameters representing camera rotation. FIG. 2B shows an illustration of motion vectors associated with a camera rotation. The $S_y$ and $S_x$ parameters are associated with a zoom out or zoom in operation which is illustrated in FIG. 2C.

In the described embodiment, the parameters $S_x$, $S_y$, $r_1$, $r_2$, $t_y$, and $t_x$ are computed using a set of motion vectors determined using the recursive hierarchical process described in U.S. patent application Ser. No. 10/833,198. Accordingly, a motion vector is determined by applying a source correlation window to a first image frame and a target correlation window to a subsequent image frame, and placing the target correlation window such that a best match with the source correlation window is obtained, that is, the contents of the source correlation window and target correlation window are as similar as possible. In addition, the recursive hierarchical method uses multiple resolution levels of the image frames. A best motion vector is first determined for the lowest resolution level by projecting the previous best motion vector at the highest resolution level down to the lowest resolution level, and testing it and one or more updates. This best motion vector is then propagated up to a higher resolution level, where some adjustments are made and a new best motion vector is determined. This new best motion vector is propagated up to yet another higher resolution level, where more adjustments are made and another new best motion vector is determined. This process is repeated until the highest, original, resolution level has been reached and a best motion vector has been identified for the original resolution level.

FIG. 1 shows one implementation of the recursive hierarchical process (100) of U.S. application Ser. No. 10/833,198. It is assumed that multiple resolution levels of the image frames have already been generated. As can be seen in FIG. 1, the recursive hierarchical process (100) for determining a motion vector starts by projecting a motion vector from a previous image frame down to a lowest resolution level (step 102). A set of update vectors is generated and tested to find a best motion vector at this lowest resolution level (step 104). In one implementation this test is performed by comparing pixels in corresponding positions in a source correlation window centered on the origin of the motion vector and a target correlation window centered on the end point of each respective update vector. The comparison can, for example, be performed by subtracting a luma value for each pixel in the source window from the corresponding pixel in the respective target windows. In this case the best match would be defined by finding a minimum sum of absolute differences (SAD) for a source correlation window and a target correlation window pair, and the best motion vector would be the vector associated with this source correlation window and a target correlation window pair.

After the minimum SAD has been found, the best vector is selected (step 106). The process (100) then examines whether there are any higher resolution levels (step 108). If there are higher resolution levels, the process propagates the best vector up to the next higher resolution level (step 110) and repeats steps 104 through 108. If there are no higher resolution levels, the process proceeds to step 112, where the best vector is selected as the motion vector and is used for motion compensation, which completes the process for the current frame.

The best vector, as determined in step 112 of FIG. 1, can then be inserted into the mathematical model represented by equation (1) above as $M_y$ and $M_x$. Those skilled in the art should appreciate that the best vector determined for any of the lower resolutions in FIG. 1, such as step 104, may also be used. In other embodiments, other vectors may be substituted for $M_y$ and $M_x$ in the camera model equation. It should be noted that although a linear least squares fit procedure is used in the described embodiment, any suitable data fitting technique can be used. Accordingly, a linear least squares fit procedure is then performed to solve for $S_x$, $S_y$, $r_1$, $r_2$, $t_y$, and $t_x$. That is, referring to the mathematical model above, since a known set of $M_y$ and $M_x$ values are provided for known corresponding x and y locations, a matrix inversion operation can be performed to determine the unknown parameters $S_x$, $S_y$, $r_1$, $r_2$, $t_y$, and $t_x$.

After the camera model parameters are determined, the camera model parameters are applied to generate camera model motion vectors $M_y$ and $M_x$ for positions y and x within an image patch or frame to provide vector candidates for one or more iterations of the recursive and hierarchical process described herein. For instance, these camera model predicted motion vectors can be used along with the updated vectors as test candidates for a SAD computation. Then, in step 106 of FIG. 1, the best vector is determined from all of the test candidates.

Figure 3:
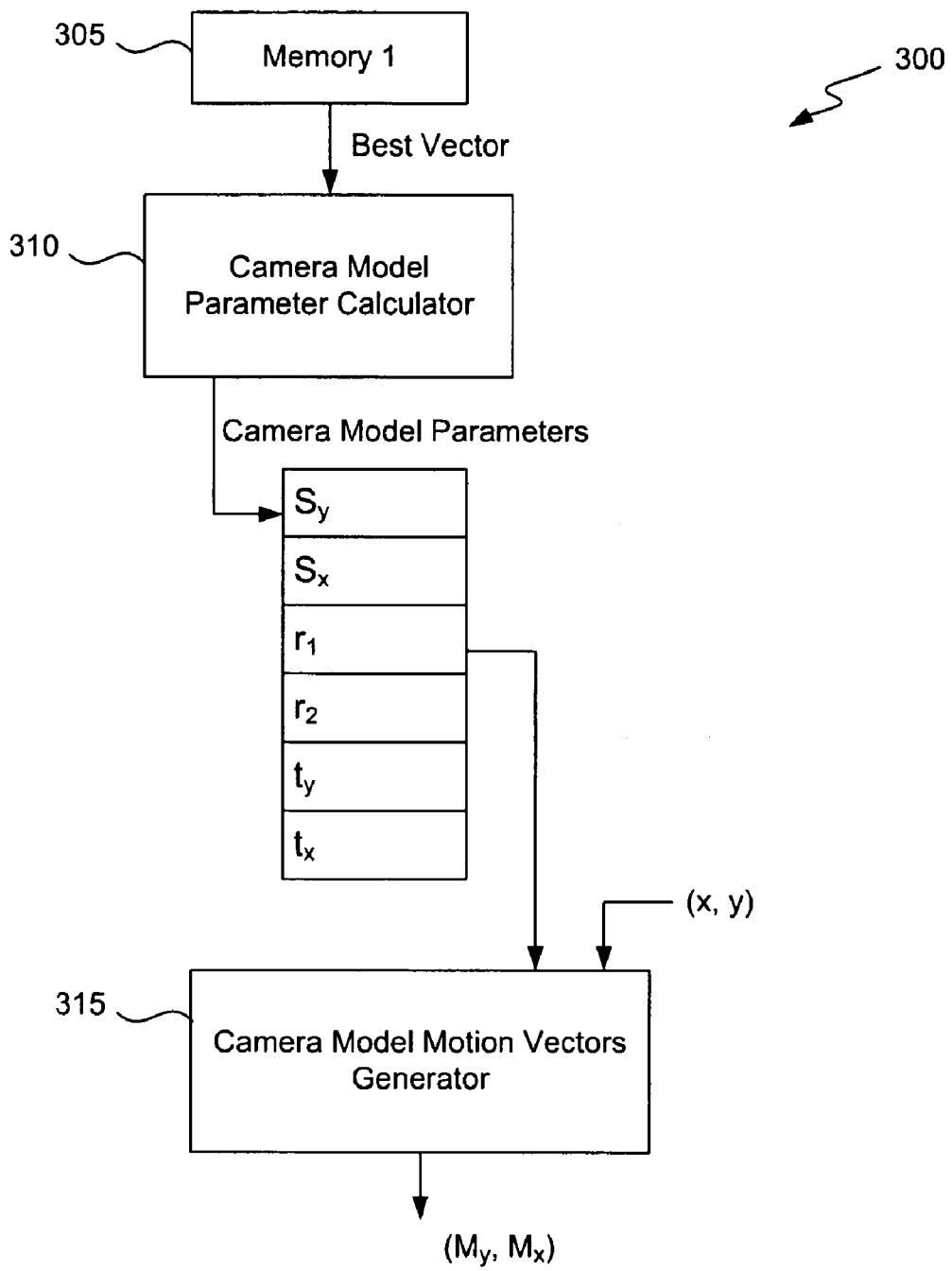
FIG. 3 shows a block diagram of an apparatus for calculating camera model parameters and generating motion vectors using a camera model.
Figure 4:
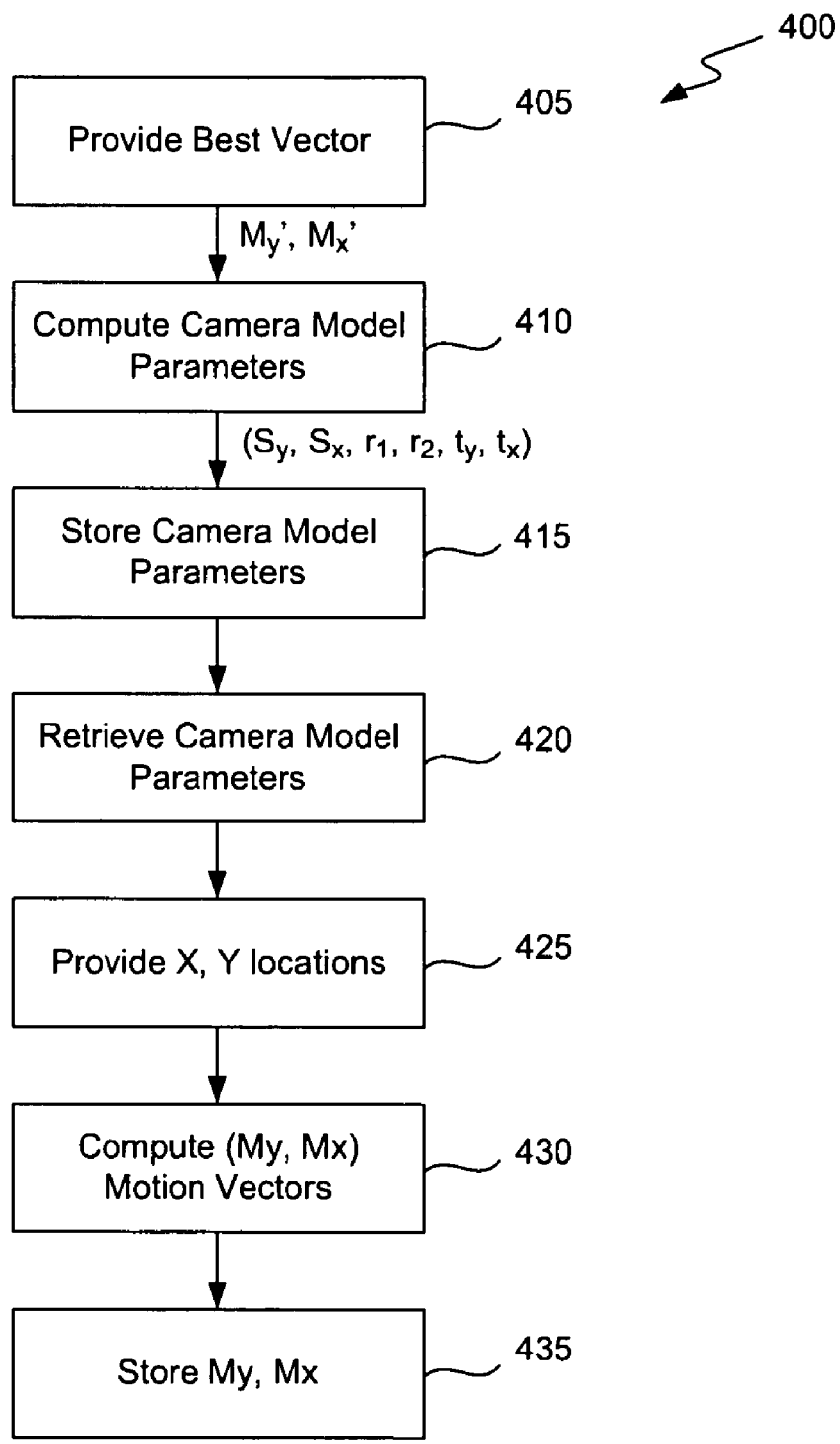
FIG. 4 shows a flowchart of a method for estimating a camera pan vector, in accordance with one embodiment of the present invention.

FIG. 3 shows a block diagram of an apparatus 300 for calculating camera model parameters and then using those camera model parameters to generate motion vectors in accordance with an embodiment of the invention. FIG. 4 shows a flow chart of a method 400 describing the operation of the apparatus of FIG. 3. In step 405, a test vector $M_y'$ and $M_x'$, such as the best vector determined in step 106 of FIG. 1, is retrieved from memory 305 by a camera model parameter calculator 310. This camera model parameter calculator 310 is preferably implemented primarily in software, although various combinations of software and hardware can be used as will be understood by those skilled in the art. Memory 305 is any suitable processor readable storage medium such as SDRAM.

In step 410 of FIG. 4, the camera model parameter calculator 310 computes camera model parameters $S_x$, $S_y$, $r_1$, $r_2$, $t_y$, and $t_x$ based on the retrieved motion vectors and known corresponding x, y locations, as described above. That is, a matrix inversion operation is performed to determine the camera model parameters $S_x$, $S_y$, $r_1$, $r_2$, $t_y$, and $t_x$. In step 415, camera model parameter calculator 310 then outputs these computed camera model parameters $S_x$, $S_y$, $r_1$, $r_2$, $t_y$, and $t_x$ to memory 310 for storage in one or more registers. In step 420, a camera model motion vector generator 315 retrieves the camera model parameters $S_x$, $S_y$, $r_1$, $r_2$, $t_y$, and $t_x$ from the registers in memory 310. Accordingly, when x, y locations for an image are provided to camera model motion vector generator 315 in step 425, the camera model motion vector generator 315 can generate motion vectors $M_y$ and $M_x$ in step 430, applying the camera model equation above. These motion vectors $M_y$ and $M_x$ are output by camera model motion vector generator 315 and can be stored in step 435. For the next iteration of the recursive hierarchical process, the stored motion vectors can be used as test candidates in addition to the recursive hierarchical predicted vectors.

Figure 5:
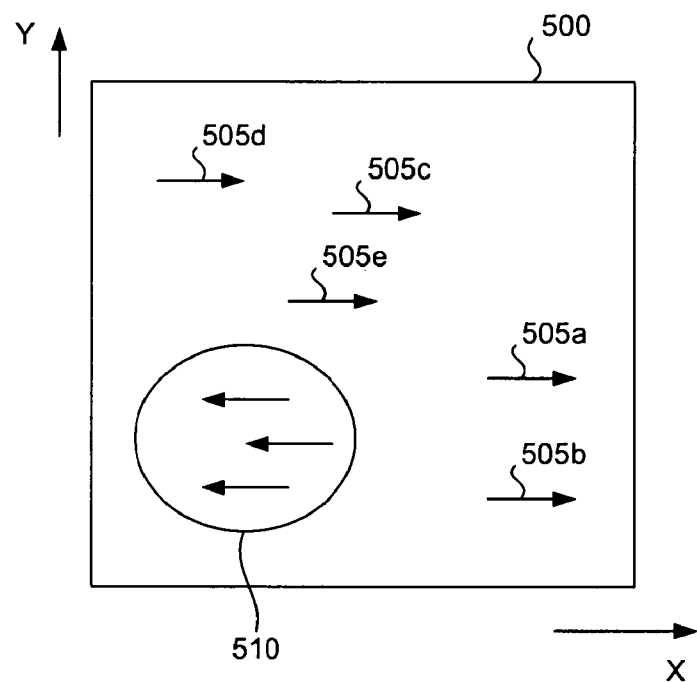
FIG. 5 shows an example of motion vectors associated with independently moving objects.

In FIG. 5, a two-dimensional representation 500 of motion vectors along X and Y directions is illustrated. In FIG. 5, a group of motion vectors 505a-505e represent an independently moving object to which a camera model is desirably fitted. On the other hand, motion vectors 510 are motion vectors associated with a further independently moving image or object that is desirably excluded from the camera model. In this example, the camera model provides a pan scenario; thus, only the $t_x$ and $t_y$ values of the mathematical model above need be computed. Here, because the majority of motion vectors 505a-505e are the same, the camera pan model is desirably fitted to provide a model of these motion vectors 505a-505e. For the camera model to be effective, the motion vectors 510 are desirably excluded as outliers when calculating the $t_x$ and $t_y$ translation parameters for the camera pan model. Techniques described below provide for the exclusion of motion vectors 510 from the camera model parameter calculations, so that a robust and accurate camera model fit is achieved.

Figure 6A:
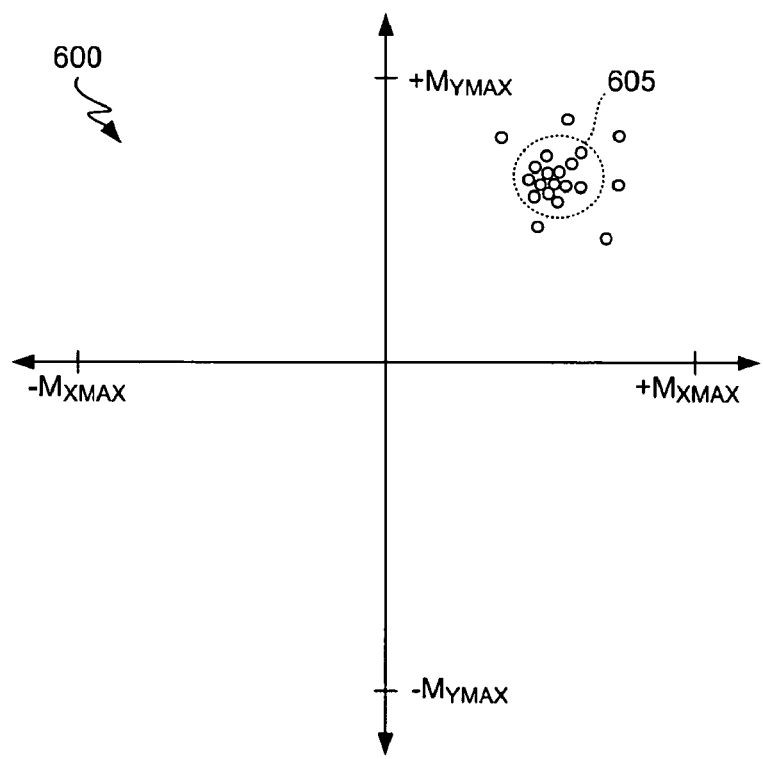
FIG. 6A shows a distribution of motion vectors along two dimensions.

FIG. 6A shows a two-dimensional distribution 600 of $M_y$ and $M_x$ values for an exemplary set of motion vectors $M_y$ and $M_x$. All of the values of the motion vectors $M_y$ and $M_x$ are within the bounds of the two-dimensional representation. That is, all of the $M_x$ values range within $-M_x$ max and $+M_x$ max; similarly, all of the $M_y$ values range within $-M_y$ max and $+M_y$ max. In one example, the $M_x$ values range between $-32$ and $+32$, and the $M_y$ values range between $-24$ and $+24$. Those skilled in the art should appreciate that these ranges of $M_y$ and $M_x$ values are only exemplary, and various other ranges may be used in accordance with embodiments of the present invention. In FIG. 6, the majority of the motion vectors form a cluster 605, indicating that all of the motion vectors have substantially similar values representing a camera pan. Thus, determining the center of mass of the cluster 605 provides the $t_x$ and $t_y$ parameters for the camera model. The vectors outside of cluster 605 are preferably excluded as outliers during the computation of $t_x$ and $t_y$.

Figure 6B:
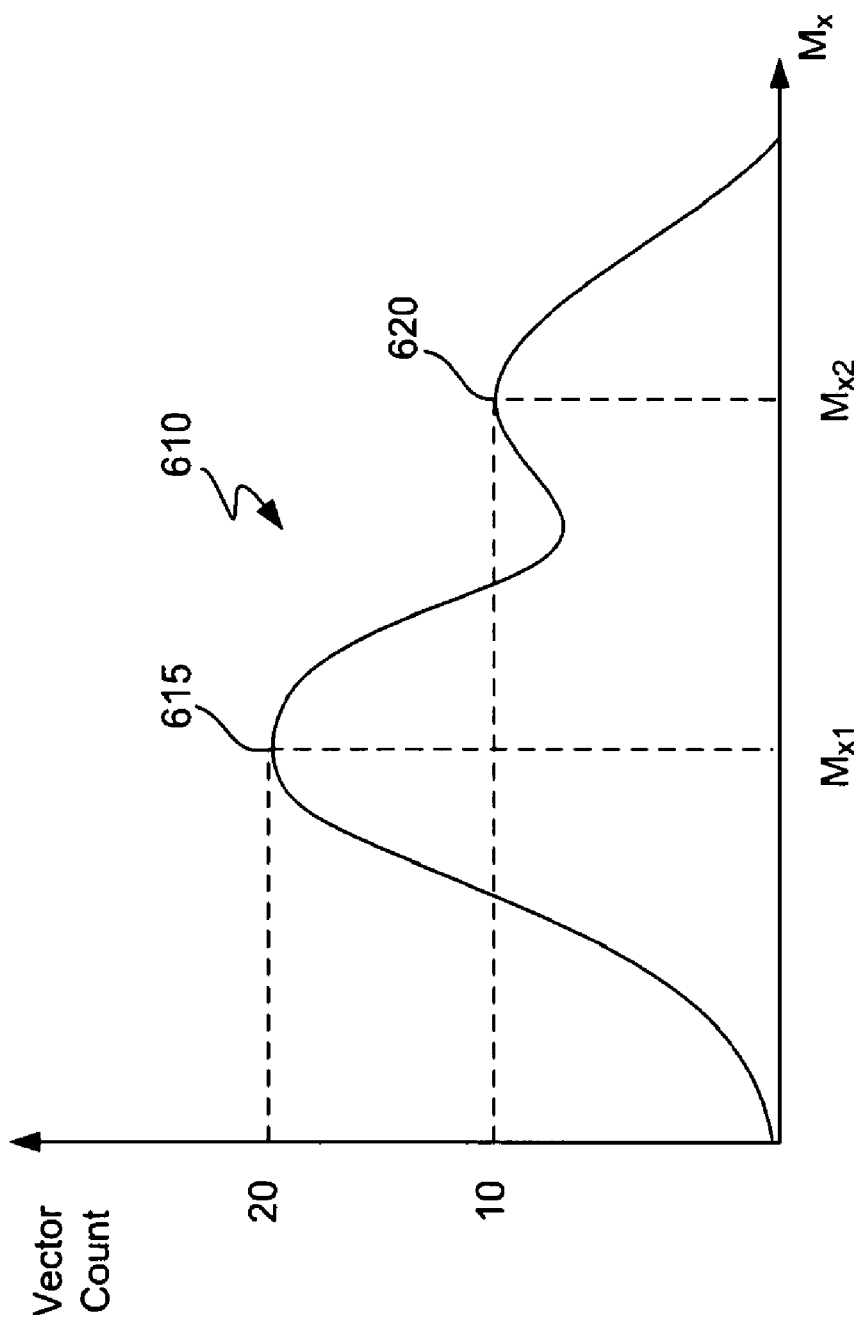
FIG. 6B shows a side view of a distribution of motion vector values.

FIG. 6B shows a side view of a distribution of $M_x$ values, such as the motion vector values of FIG. 6A. The distribution of $M_x$ values yields a first hill 615 and a second hill 620. The hills 615 and 620 indicate the number of vectors having particular $M_x$ values. Thus, first hill 615 is formed because of a large concentration of vectors having the value $M_{x1}$. The relatively smaller second hill 620 is formed by another concentration of vectors having the value $M_{x2}$. The hill 615 having the larger count of vectors for a particular $M_x$ value, referred to herein as the dominant hill, represents a neighborhood for locating the true $t_x$ and $t_y$ parameters for the camera model. Methods and apparatus according to embodiments of the present invention provide for identifying the dominant hill 615, excluding smaller hills such as hill 620, then determining a center of mass of the dominant hill 615 as the camera model parameters $t_x$ and $t_y$.

Figure 7:
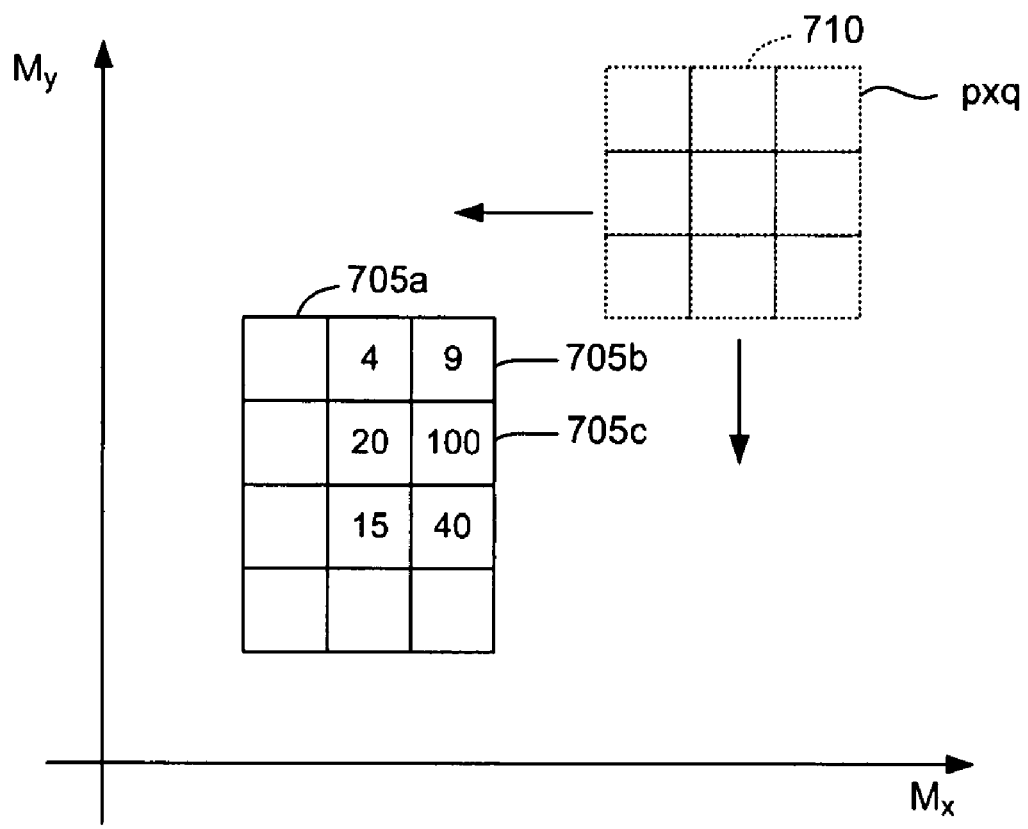
FIG. 7 shows a distribution of motion vector values in a two-dimensional histogram having bins.

FIG. 7 shows a top view of an example of a two-dimensional histogram with bins 705a-705c for accumulating discrete $M_y$ and $M_x$ values. Because the $M_y$ and $M_x$ values are discrete, the histogram is represented as a grid, with each block or bin in the grid representing a particular $M_y$ and $M_x$ value. In the example in which the $M_x$ values range between $-32$ and $+32$, and the $M_y$ values range between $-24$ and $+24$, a two-dimensional distribution of the motion vector values would have a grid size of 64×48 total distributions or bins in which the particular motion vector values can be located. The aggregation of the bins provides a 64×48 two-dimensional histogram. The bins 705 have bin counts indicating the number of motion vector $M_y$ and $M_x$ values in the respective bins. For instance, bin 705b has a count of 7 motion vectors, and bin 705c has a count of 100 motion vectors. Each bin count is incremented for every motion vector value deposited in that bin. In this example, a neighborhood of bins including bin 705c represents the dominant hill of the histogram. It is desirable to identify this dominant hill for determining an accurate camera pan vector estimate using techniques described below.

Figure 8:
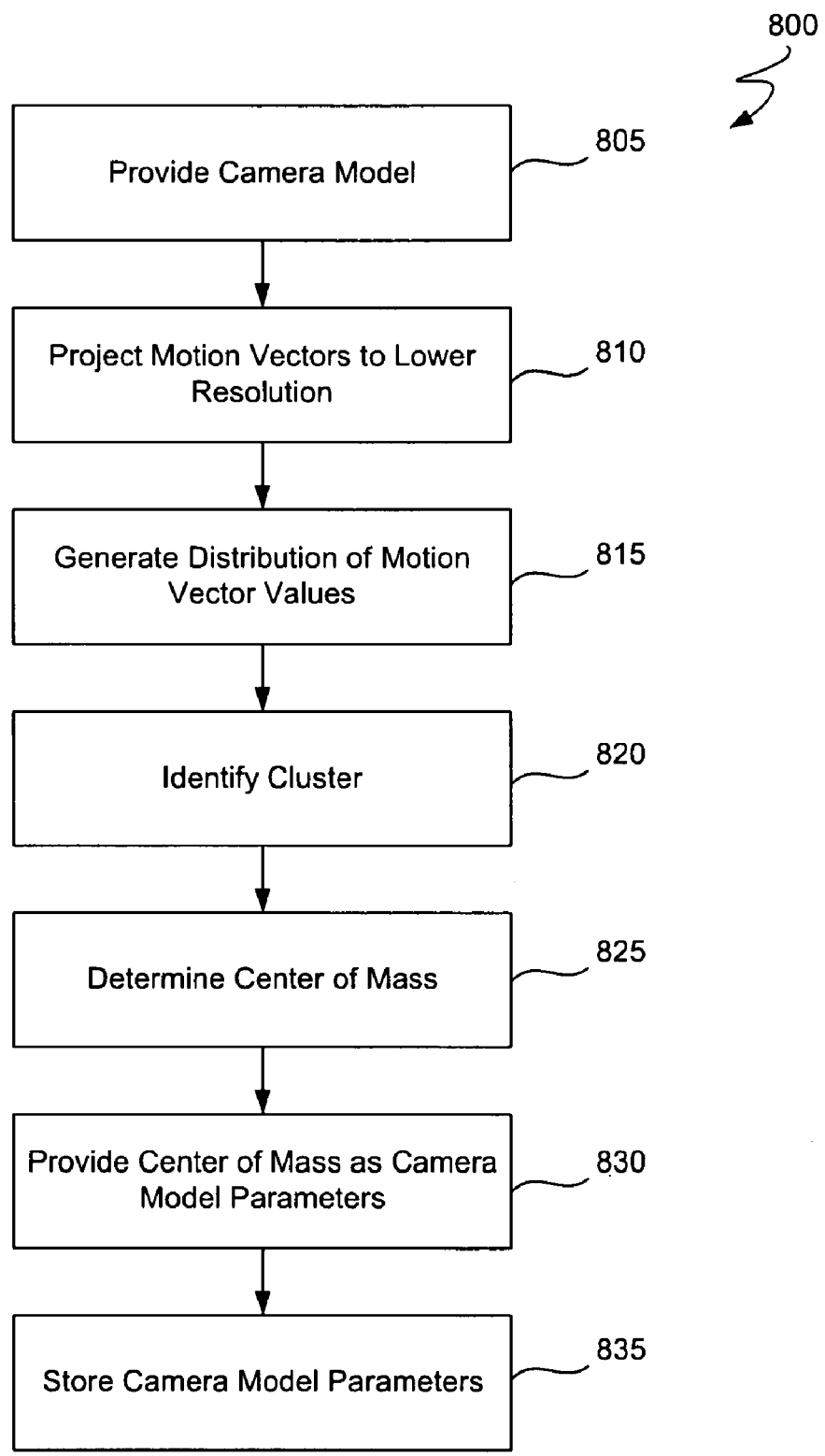
FIG. 8 shows a flowchart of a method for motion vector estimation using a camera model for a digital video sequence of frames.
Figure 9:
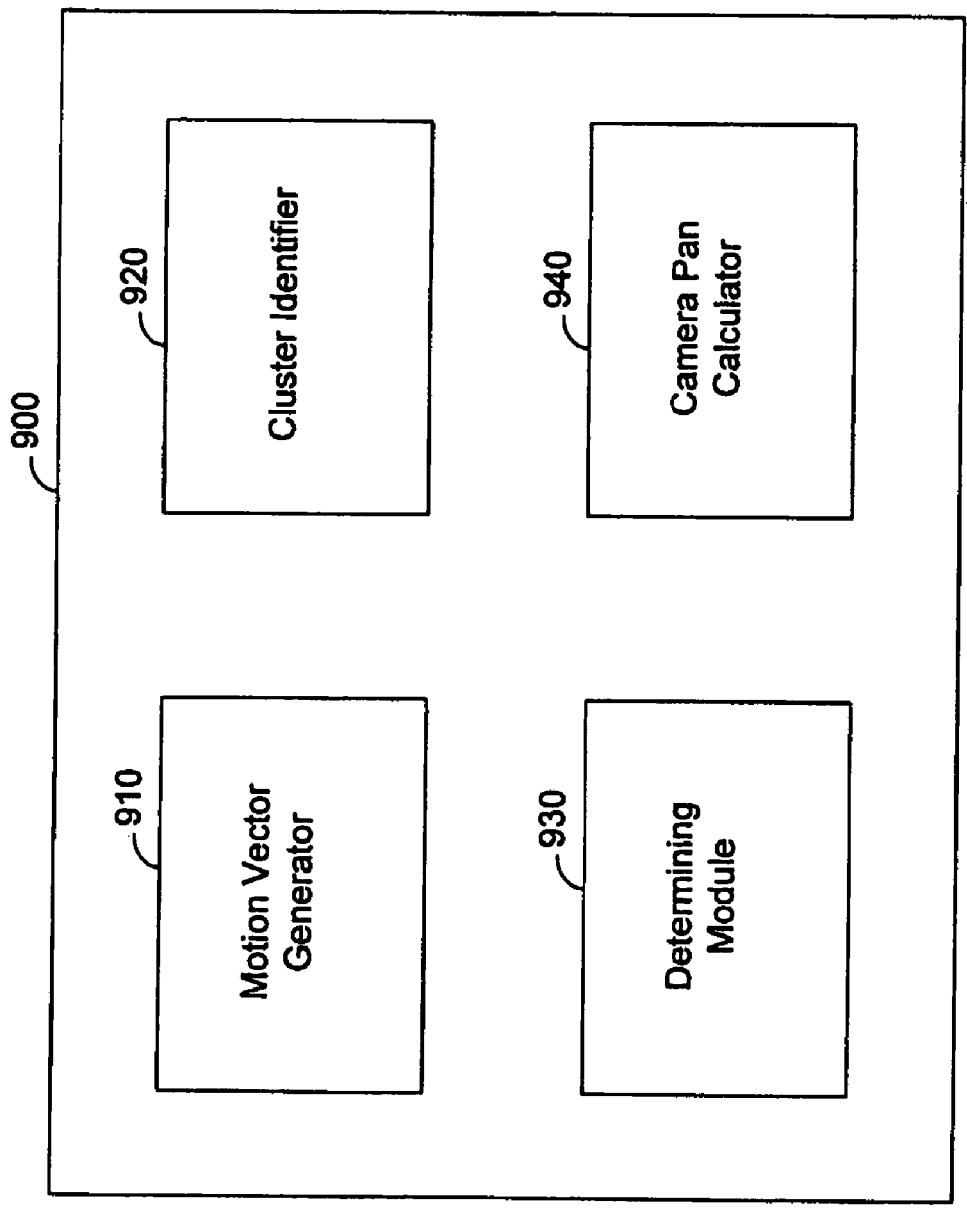
FIG. 9 shows an apparatus for estimating a camera pan vector, in accordance with one embodiment of the present invention.
Figure 4:
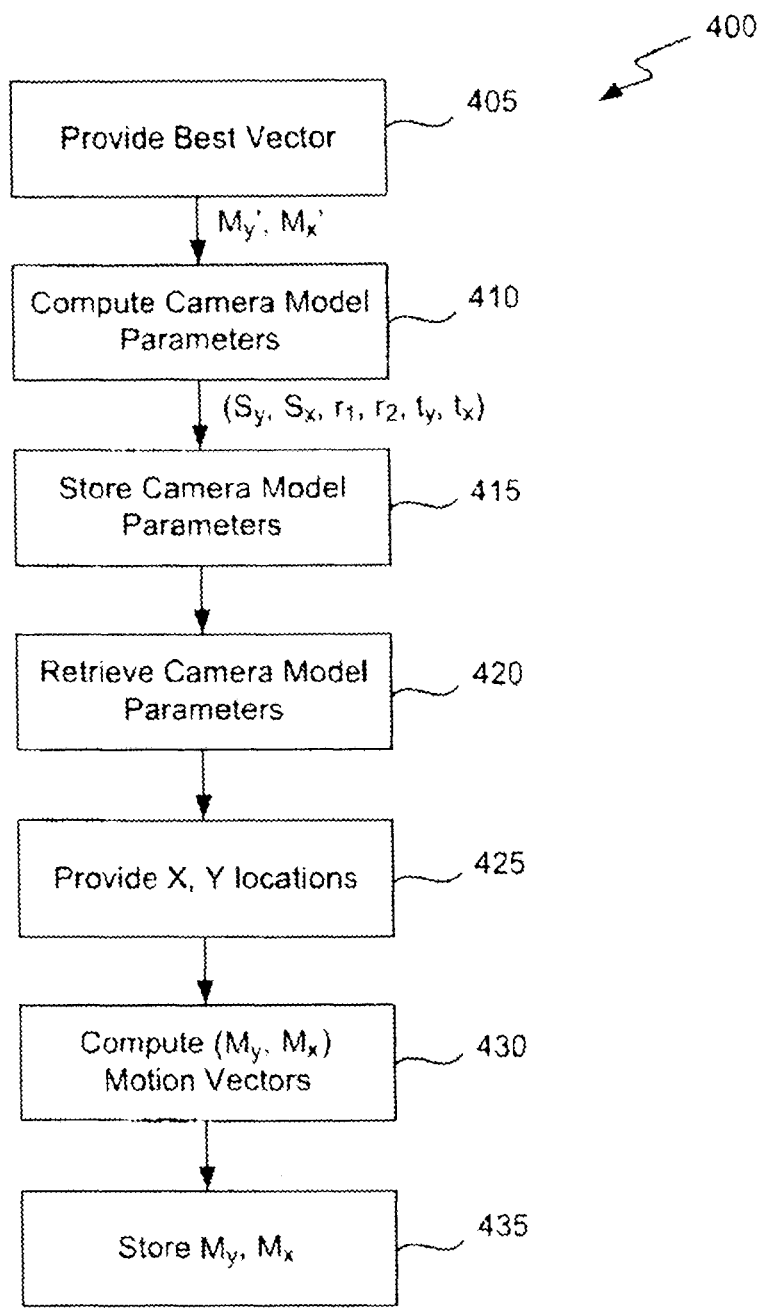

FIGS. 8 and 9 show a method 800 and apparatus 900, respectively, for estimating a camera pan vector, performed in accordance with one embodiment of the present invention.

The apparatus 900 can be implemented with various combinations of hardware and software, as will be understood by those skilled in the art. The method of FIG. 8 is described with reference to FIG. 9. In step 805, a camera model is provided. This camera model is defined according to the method described with reference to FIGS. 3 and 4, as explained above. The camera model is used to generate a plurality of camera model motion vectors, for instance, a two-dimensional set of motion vectors $M_y$ and $M_x$, as explained above, for an image patch in a plurality of frames of the digital video sequence. The camera model includes a plurality of parameters, such as $t_x$ and $t_y$, as described above, which are applied to y and x coordinates to generate the motion vectors, $M_y$ and $M_x$. The camera model motion vectors are provided in a first resolution, such as 1:1.

In step 810 of FIG. 8, the camera model motion vectors $M_y$ and $M_x$ are preferably projected in a lower resolution. This step of projecting the motion vectors in the lower resolution conserves memory and reduces computational demands. Various resolutions may be used. In one example, where the original or first resolution is 1:1, this lower resolution is 1:2, 1:4, or 1:8. Accordingly, the number of bins in the two-dimensional histogram of FIG. 9 is greatly reduced. For instance, when the original $M_x$ value range of $-32$ to $+32$ and value range of $-24$ to $+24$ is reduced to 1:2, the corresponding bin count is reduced from 64×48 to 32×24. That is, scaling the motion vector values by a factor of 2 causes the bin count to be reduced by a factor of 4. In this example, the bin counts for 4 neighboring bins are effectively combined into a single bin. Various other reduced resolutions may be used, as will be understood by the skilled artisan.

In step 815 of FIG. 8, a motion vector generator 910, shown in FIG. 9, generates a distribution of the motion vectors. When the motion vectors are two-dimensional, the particular values of the set of two-dimensional motion vectors are distributed in a two-dimensional histogram with bins, as explained above with reference to FIG. 7.

In step 820 of FIG. 8, a cluster identifier 920, shown in FIG. 9, finds the dominant hill in the two-dimensional histogram of FIG. 7. That is, cluster identifier 920 identifies a cluster in the distribution of motion vector values as having the highest concentration of motion vectors in the distribution. In one embodiment, this identification step includes accumulating bins within a plurality of neighborhoods in the two-dimensional histogram as shown in FIG. 7. These neighborhoods are defined by a pxq window 710 or other window of predetermined size, e.g. 3×3, 4×4, 12×12, 100×100 moved over various positions in the histogram such that a certain number of bins are included within the window at each position. All of the bin counts within the window at a certain position are added to provide a total bin count associated with that window or neighborhood. Then, the neighborhood having the higher or highest accumulation of bins is selected as the identified cluster. This identified cluster provides the dominant hill of the histogram, such as hill 615 in FIG. 6B.

In step 825 of FIG. 8, a determining module 930 shown in FIG. 9 determines a center of mass for the identified cluster from step 1020. This center of mass calculation is preferably performed within another window of predetermined size. In one embodiment, this window has a size m×n which is larger than the pxq window containing the neighborhoods used for the bin accumulations in step 820. In step 830, the center of mass determined in step 825 is provided as one or more of the camera model parameters for subsequent motion vector calculation, referring to the mathematical representation of the camera model above. For instance, in the camera pan example, the determined center of mass is provided as the translation parameters, $t_x$ and $t_y$. In embodiments in which the motion vectors were projected from an original resolution to a lower resolution in step 810, the determined center of mass is preferably projected back to the original resolution. In some embodiments, the calculations for this projection are done using floating point to provide a more accurate projection. The camera model parameters are then stored in step 835, and later retrieved by camera pan calculator 940 of FIG. 9 for the generation of camera pan model motion vectors $M_y$ and $M_x$, using equation (1) above. In one embodiment, these camera pan model motion vectors $M_y$ and $M_x$ are then used to determine test candidates for the recursive hierarchical process described in U.S. application Ser. No. 10/833,198.

Using the camera model predicted vector as an additional candidate vector in the recursive hierarchical process minimizes the possibility that the recursive portion of the recursive hierarchical search converges into a false local minimum instead of the true minimum. The camera predicted vector candidate can direct the process towards a true minimum. In some embodiments, as described herein, motion vectors predicted or generated by the camera model are also used as test candidates for SAD computation.

Embodiments of the invention, including the apparatus of FIGS. 3 and 9, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

The invention claimed is:

1. A method comprising:
   identifying a motion vector of an image at a first resolution;
   using the identified motion vector to generate a first test vector and a second test vector for the image at a second resolution, wherein the second resolution is different than the first resolution; and
   generating a first motion vector and a second motion vector for known position locations in the image at the second resolution based on one or more camera model parameters determined using the first and second test vectors.

2. The method of claim 1, wherein the one or more camera model parameters include at least one of a horizontal translation parameter, vertical translation parameter, camera rotation parameter, zoom out parameter, and zoom in parameter.

3. The method of claim 1, further comprising estimating the one or more camera model parameters at the second resolution of the image based on the first test vector, the second test vector, and the known position locations in the image.

4. The method of claim 3, wherein estimating the one or more camera model parameters comprises:
   generating a distribution of motion vectors;
   identifying a cluster in the distribution of motion vectors;
   determining a center of mass of the identified cluster; and
   estimating the one or more camera model parameters based on the determined center of mass.

5. The method of claim 1, further comprising:
   generating a plurality of motion vectors recursively using the first motion vector and the second motion vector as initial inputs.

6. The method of claim 1, wherein the image is an image frame.

7. The method of claim 6, wherein the identified motion vector has a minimum sum of absolute differences of pixels positioned relative to pixels in a previous motion vector from a previous image frame.

8. The method of claim 7, wherein identifying a motion vector of an image at a first resolution comprises:
   projecting the previous motion vector from the previous image frame at the first resolution;
   providing a plurality of motion vectors in the image frame; and
   comparing a position of pixels in each of the plurality of motion vectors in the image frame to a position of pixels in the previous motion vector from the previous image frame to identify the motion vector in the image frame having the minimum sum of absolute differences of pixels positioned relative to pixels in the previous motion vector from the previous image frame.

9. An apparatus comprising:
   a motion vector selector configured to identify a motion vector of an image at a first resolution;
   a camera model parameter calculator configured to use the identified motion vector to generate a first test vector and a second test vector for the image at a second resolution, wherein the second resolution is different than the first resolution; and
   a camera model motion vector generator configured to generate a first motion vector and a second motion vector for known position locations in the image at the second resolution based on one or more camera model parameters determined using the first and second test vectors.

10. The apparatus of claim 9, wherein the one or more camera model parameters include at least one of a horizontal translation parameter, vertical translation parameter, camera rotation parameter, zoom out parameter, and zoom in parameter.

11. The apparatus of claim 9, wherein the camera model parameter calculator is further configured to estimate the one or more camera model parameters at the second resolution of the image based on the first test vector, the second test vector, and the known position locations in the image.

12. The apparatus of claim 11, wherein the camera model parameter calculator is configured to estimate the one or more camera model parameters by:
generating a distribution of motion vectors;
identifying a cluster in the distribution of motion vectors;
determining a center of mass of the identified cluster; and
estimating the one or more camera model parameters based on the determined center of mass.

13. The apparatus of claim 9, wherein the image is an image frame.

14. The apparatus of claim 13, wherein the identified motion vector has a minimum sum of absolute differences of pixels positioned relative to pixels in a previous motion vector from a previous image frame.

15. The apparatus of claim 14, wherein the motion vector selector is configured to identify a motion vector of an image at a first resolution by:
projecting the previous motion vector from the previous image frame at the first resolution;
providing a plurality of motion vectors in the image frame; and
comparing a position of pixels in each of the plurality of motion vectors in the image frame to a position of pixels in the previous motion vector from the previous image frame to identify the motion vector in the image frame having the minimum sum of absolute differences of pixels positioned relative to pixels in the previous motion vector from the previous image frame.

16. A non-transitory computer-readable medium having instructions stored thereon that, in response to execution by a computing device, cause the computing device to perform operations comprising:
identifying a motion vector of an image at a first resolution;
using the identified motion vector to generate a first test vector and a second test vector for the image at a second resolution, wherein the second resolution is different than the first resolution; and
generating a first motion vector and a second motion vector for known position locations in the image at the second resolution based on one or more camera model parameters determined using the first and second test vectors.

17. The non-transitory computer-readable medium of claim 16, having further instructions stored thereon that, in response to execution by the computing device, cause the computing device to perform operations comprising:
generating a plurality of motion vectors recursively using the first motion vector and the second motion vector as initial inputs.

18. The non-transitory computer-readable medium of claim 17, having further instructions stored thereon that, in response to execution by the computing device, cause the computing device to perform operations comprising:
determining a cluster from a majority of the plurality of motion vectors;
determining horizontal and vertical translation camera model parameters based on a center of mass of the cluster; and
discarding any motion vectors of the plurality of motion vectors that are not part of the cluster.

19. The non-transitory computer-readable medium of claim 16, wherein the identified motion vector has a minimum sum of absolute differences of pixels positioned relative to pixels in a previous motion vector from a previous image.

20. The non-transitory computer-readable medium of claim 16, wherein the image is an image frame.

21. The non-transitory computer-readable medium of claim 20, wherein identifying a motion vector of an image at a first resolution comprises:
projecting a previous motion vector from a previous image frame at the first resolution;
providing a plurality of motion vectors in the image frame; and
comparing a position of pixels in each of the plurality of motion vectors in the image frame to a position of pixels in the previous motion vector from the previous image frame to identify the motion vector in the image frame having the minimum sum of absolute differences of pixels positioned relative to pixels in the previous motion vector from the previous image frame.

22. The non-transitory computer-readable medium of claim 16, wherein the one or more camera model parameters are estimated based on the first test vector, the second test vector, and the known position locations in the image at the second resolution.

23. The non-transitory computer-readable medium of claim 16, wherein the one or more camera model parameters include at least one of a horizontal camera pan parameter, vertical camera pan parameter, zoom in parameter, zoom out parameter, and camera rotation parameter.

* * * * *

UNITED STATES PATENT AND TRADEMARK OFFICE
CERTIFICATE OF CORRECTION

PATENT NO. : 8,315,436 B2  
APPLICATION NO. : 13/177963  
DATED : November 20, 2012  
INVENTOR(S) : Nair Page 1 of 2

It is certified that error appears in the above-identified patent and that said Letters Patent is hereby corrected as shown below:

On Title Page 2, Item (56), under "OTHER PUBLICATIONS", in Column 2, Line 14, delete ""Real-Time 2 3" and insert -- "Real-Time 2-3 --, therefor.

On Title Page 3, Item (56), under "OTHER PUBLICATIONS", in Column 1, Line 12, delete "Park. J.-I.," and insert -- Park, J.-II., --, therefor.

In the Drawings:

In Fig. 4, Sheet 5 of 10, for Tag "430", in Line 1, delete "(My, Mx) and insert -- $(M_y, M_x)$ --, therefor.

In Fig. 4, Sheet 5 of 10, for Tag "435", in Line 1, delete "My, Mx" and insert -- $M_y, M_x$ --, therefor.

In the Specifications:

In Column 1, Line 10, delete "in turn." and insert -- in turn, --, therefor.

Signed and Sealed this  
Fourth Day of June, 2013

Teresa Stanek Rea  
*Acting Director of the United States Patent and Trademark Office*